(12) United States Patent
Larson

(10) Patent No.: US 12,085,198 B2
(45) Date of Patent: Sep. 10, 2024

(54) TIGHT-SEAL PIPING COMPONENT

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/236,192

(22) Filed: Apr. 21, 2021

(65) Prior Publication Data

US 2022/0341519 A1 Oct. 27, 2022

(51) Int. Cl.
*F16L 15/00* (2006.01)

(52) U.S. Cl.
CPC .......... *F16L 15/008* (2013.01); *F16L 15/007* (2013.01)

(58) Field of Classification Search
CPC ............................... F16L 15/08; F16L 15/008
USPC ......................................... 285/354, 355, 197
See application file for complete search history.

(56) References Cited

U.S. PATENT DOCUMENTS

| | | | | |
|---|---|---|---|---|
| 997,351 A * | 7/1911 | Williams | ............... | F16L 58/182 285/355 |
| 2,187,217 A * | 1/1940 | Francis | ................. | F16L 15/008 285/355 |
| 2,358,408 A * | 9/1944 | McMurray | ............ | F16L 19/075 285/354 |
| 2,374,138 A * | 4/1945 | Sanford | ................... | F16L 15/08 285/354 |
| 2,755,111 A * | 7/1956 | Newell | ................. | F16L 19/075 285/354 |
| 2,779,610 A * | 1/1957 | Risley | ................... | F16L 19/075 285/354 |
| 2,787,479 A * | 4/1957 | Burns | ................... | F16L 19/075 285/354 |
| 2,837,351 A * | 6/1958 | Bailey | ................... | F16L 25/023 285/354 |
| 3,100,656 A * | 8/1963 | MacArthur | .......... | F16L 15/008 285/55 |
| 3,489,441 A * | 1/1970 | Malcolm | ................. | F16L 41/12 285/197 |
| 3,811,710 A * | 5/1974 | Dula | ....................... | F16L 15/04 285/355 |
| 3,848,905 A * | 11/1974 | Hammer | ............... | F16L 19/061 285/348 |
| 3,915,478 A * | 10/1975 | Al | ......................... | F16L 19/075 285/342 |
| 3,995,655 A * | 12/1976 | Sands | ..................... | F16L 41/06 285/197 |

(Continued)

*Primary Examiner* — David Bochna
(74) *Attorney, Agent, or Firm* — Taylor English Duma LLP

(57) ABSTRACT

Example aspects of a tight-seal piping component, a tight-seal piping assembly, and a method for preventing leaking in a piping assembly are disclosed. The tight-seal piping component can comprise a fitting body defining a fitting inner surface, a fitting outer surface opposite the fitting inner surface, a first fitting end, and a second fitting end opposite the first fitting end, the fitting inner surface defining: an interior channel defining a fitting axis; a seal stop surface within the interior channel; and internal threading between first fitting end and the seal stop surface, the internal threading defining straight threading extending in a direction about perpendicular to the fitting axis; and a seal received within interior channel and abutting seal stop surface.

26 Claims, 9 Drawing Sheets

(56) References Cited

U.S. PATENT DOCUMENTS

| | | | | | |
|---|---|---|---|---|---|
| 4,054,305 | A | * | 10/1977 | Gajajiva | F16L 15/08 285/355 |
| 4,073,513 | A | * | 2/1978 | Blakeley | F16L 41/12 285/355 |
| 4,296,954 | A | * | 10/1981 | Fujimaki | F16L 15/008 285/355 |
| 4,537,406 | A | * | 8/1985 | Hirasuna | F16L 15/007 285/355 |
| 4,856,828 | A | * | 8/1989 | Kessler | F16L 15/04 285/355 |
| 4,960,546 | A | * | 10/1990 | Tharp | B01F 23/2311 285/197 |
| 5,000,489 | A | * | 3/1991 | Burke | F16L 41/12 285/197 |
| 5,056,831 | A | * | 10/1991 | Ho | F16L 15/08 285/355 |
| 5,149,144 | A | * | 9/1992 | Blakeley | A62C 35/68 285/197 |
| 7,331,615 | B2 | * | 2/2008 | Cheytanov | F16L 19/025 285/354 |
| 2003/0132632 | A1 | * | 7/2003 | Schoonen | F16L 37/088 285/355 |
| 2014/0042742 | A1 | * | 2/2014 | Pang | F16L 19/0218 285/355 |
| 2016/0298400 | A1 | * | 10/2016 | Sabatier | E21B 19/16 |

* cited by examiner

TIGHT-SEAL PIPING COMPONENT

TECHNICAL FIELD

This disclosure relates to piping systems. More specifically, this disclosure relates to tight-seal piping components.

BACKGROUND

Piping components are often fastened together by mating threading. Some piping components comprise tapered threading, while other comprise straight threading. An adapter can be required to connect a piping component comprising tapered threading to a piping component comprising straight threading, which can increase labor time, labor cost, and materials cost. Additionally, the angle of tapered threading can vary between piping components, and particularly between piping components made by differing manufacturers. When the tapered threading between two piping components does not suitably match, the piping components may not be able to properly connect together and leaking can occur.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is tight-seal piping component comprising a fitting body defining a fitting inner surface, a fitting outer surface opposite the fitting inner surface, a first fitting end, and a second fitting end opposite the first fitting end, the fitting inner surface defining: an interior channel defining a fitting axis; a seal stop surface within the interior channel; and internal threading between first fitting end and the seal stop surface, the internal threading defining straight threading extending in a direction about perpendicular to the fitting axis; and a seal received within interior channel and abutting seal stop surface.

Also disclosed is a tight-seal piping assembly comprising a fitting body defining a fitting inner surface, the fitting inner surface defining an interior channel, a seal stop surface within the interior channel, and straight threading within the interior channel and oriented between the seal stop surface and a first fitting end of the fitting body; a connecting piping component defining an outer piping surface, the outer piping surface defining mating straight threading proximate to a first piping end of the connecting piping component, wherein the first piping end of the connecting piping component is received within the interior channel and the straight threading is rotationally engaged with the mating straight threading; and a seal received within the interior channel and compressed between the seal stop surface and the first piping end of the connecting piping component.

Additionally, disclosed is a method of preventing leaking in a piping assembly, the method comprising inserting a first piping end of a connecting piping component within an interior channel of a tight-seal piping component, wherein the tight-seal piping component defines straight internal threading within the interior channel and the connecting piping component defines straight external threading proximate to the first piping end; rotationally engaging the straight internal threading of the tight-seal piping component with the straight external threading of the connecting piping component; advancing the first piping end of the connecting piping component through the interior channel by rotating the tight-seal piping component relative to the connecting piping component; and creating a fluid-tight seal between the tight-seal piping component and the connecting piping component by compressing a seal between a seal stop surface of the tight-seal piping component and the first piping end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
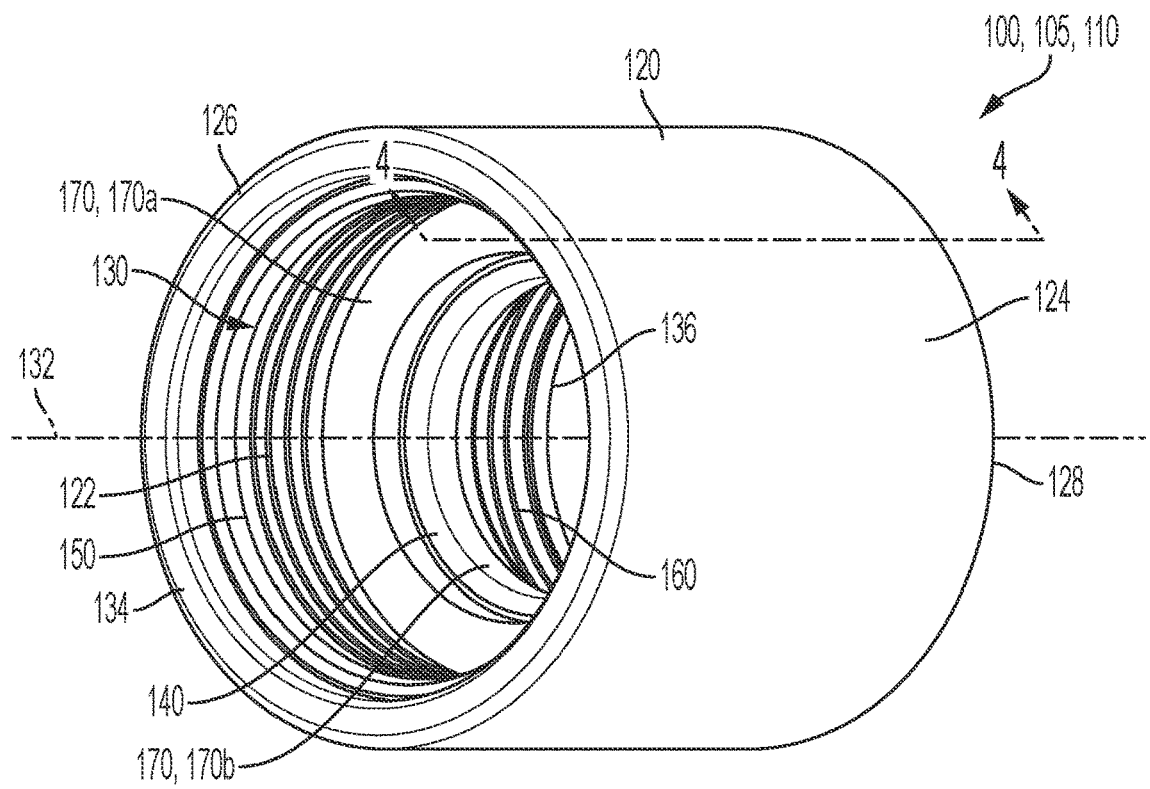
FIG. 1 is a left perspective view of a tight-seal coupling, in accordance with one aspect of the present disclosure, wherein the tight-seal coupling comprises a fitting body and a pair of seals.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a tight-seal piping component and associated methods, systems, devices, and various apparatus. Example aspects of the tight-seal piping component can comprise a fitting body and a seal. The fitting body can define straight internal threading in some aspects. It would be understood by one of skill in the art that the tight-seal piping component is described in but a few exemplary embodiments among many. No particular terminology or description should be considered limiting on the disclosure or the scope of any claims issuing therefrom.

Figure 2:
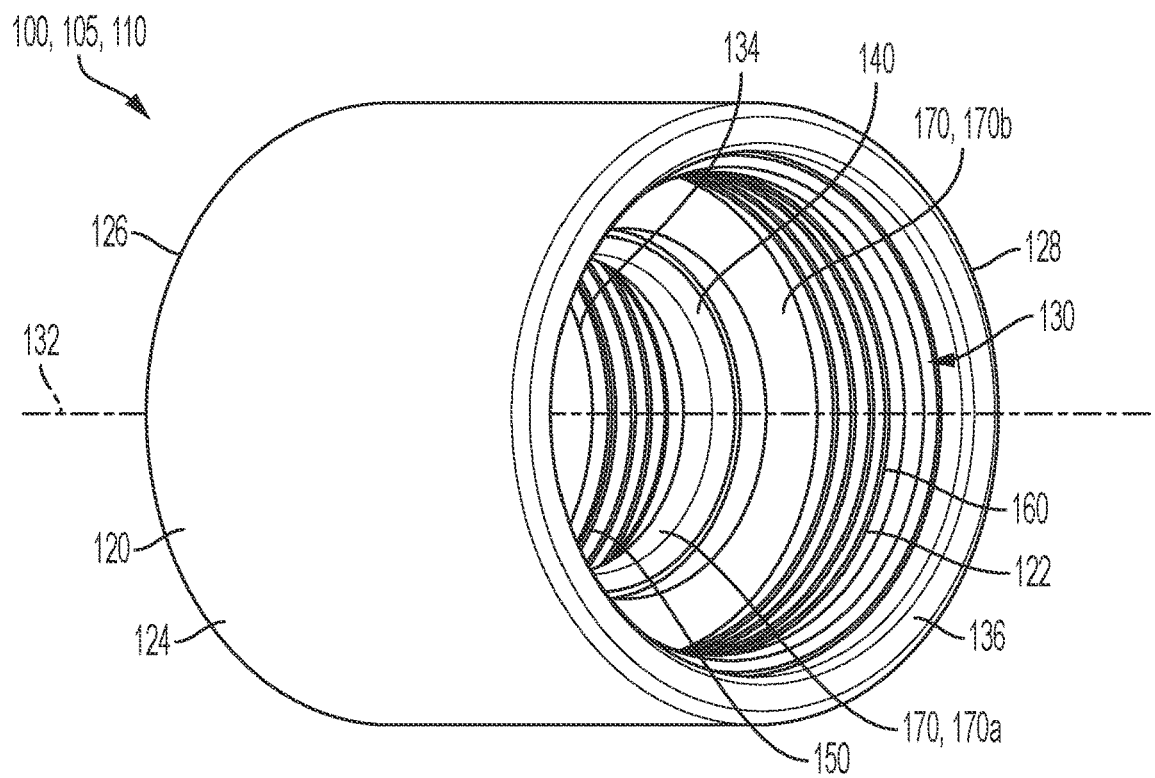
FIG. 2 is a right perspective view of the tight-seal coupling of FIG. 1.

FIG. 1 is a left perspective view of a tight-seal piping component 100, in accordance with one aspect of the present disclosure, and FIG. 2 is a right perspective view of the tight-seal piping component 100. The tight-seal piping component 100 can be, for example, a tight-seal fitting 105, as shown, a tight-seal saddle 1110 (shown in FIG. 11), a tight-seal valve, or any other suitable type of piping component known in the art. Example aspects of fittings can include but are not limited to, couplers, adapters, extenders, increasers, reducers, elbows, tees, caps, unions, and the like. The tight-seal piping component 100, such as the tight-seal fitting 105, can connect to and seal tightly with one or more connecting piping components 600 (shown in FIG. 6) of a piping system to enhance leak prevention at the tight-seal piping component. The connecting piping components 600 can include, but are not limited to fittings, pipe lengths, hoses and tubing, pumps, tanks, valves, and the like. Example aspects of piping systems can include, but are not limited to, drinking water systems, sewage systems, gas systems, and the like. According to example aspects, fluid (e.g., liquid or gas) can be transferred through the piping system, and in some aspect, may be transferred through the tight-seal piping component 100. The tight-seal piping component 100 can be configured to prevent the fluid from leaking at the point of connection between the tight-seal piping component 100 and the connecting piping component(s) 600.

In the present aspect, the tight-seal fitting 105 can be a tight-seal coupling 110. Example aspects of the tight-seal coupling 110 can comprise a fitting body 120. As shown, the fitting body 120 be substantially cylindrical in shape and can define a fitting outer surface 124 and a fitting inner surface 122 opposite the fitting outer surface 124. The fitting body 120 can further define a first fitting end 126 and a second fitting end 128 opposite the first fitting end 126. According to example aspects, the fitting inner surface 122 can define an interior channel 130 extending from the first fitting end 126 to the second fitting end 128. Fluid in the piping system can flow through the interior channel 130 from the first fitting end 126 to the second fitting end 128 and/or from the second fitting end 128 to the first fitting end 126. A fitting axis 132 can be defined through a center of the interior channel 130. As shown, a first opening 134 can allow access to the interior channel 130 at the first fitting end 126, and a second opening 136 can allow access to the interior channel 130 at the second fitting end 128. According to example aspects, first and second connecting piping components 600a,600b (shown in FIG. 6) can be connected to the tight-seal coupling 110 at the first and second fitting ends 126, 128, respectively. Fluid can flow from the first connecting piping component 600a through the first opening 134 and into the interior channel 130, through the interior channel 130, and out of the interior channel 130 through the second opening 136 and into the second connecting piping component 600b. In some aspects, fluid can also or alternatively flow in the reverse direction. Example aspects of the fitting body 120 can be formed from a metal material in some aspects, such as, for example, brass or steel. In other aspects, the fitting body 120 can be formed from any other suitable material known in the art, including, but not limited to, other metals, plastics, composites, and the like.

In the present aspect, an inner flange 140 or inner shoulder can extend substantially radially inward from the fitting inner surface 122, relative to the fitting axis 132. In some aspects, the inner flange 140 can be monolithically formed with the fitting body 120, as shown. In other aspects, the inner flange 140 can be formed separately from the fitting body 120, as shown and described in further detail with respect to FIG. 13. The inner flange 140 can be oriented substantially centrally between the first fitting end 126 and second fitting end 128. In other aspects, the inner flange 140 can be oriented closer to either the first fitting end 126 or the second fitting end 128. In other aspects, the fitting body 120 can define additional inner flanges 140 or inner shoulders, depending upon the length of the tight-seal coupling 110. Furthermore, in example aspects, the fitting inner surface 122 can define first threading 150 at or near the first fitting end 126. For example, as shown, the first threading 150 can extend in a helical pattern substantially from first fitting end 126 towards the inner flange 140. The first threading 150 can be internal threading (i.e., female threading) in the present aspect. In some aspects, the fitting inner surface 122 can also define second threading 160 at or near the second fitting end 128. For example, as shown, the second threading 160 can extend in a helical pattern substantially from the second fitting end 128 towards the inner flange 140. The second threading 160 can be internal threading (i.e., female threading) in the present aspect. The first threading 150 and/or the second threading 160 may or may not extend fully to the inner flange 140. For example, in the present aspect, the first threading 150 and the second threading 160 can terminate a distance from the inner flange 140, as described in further detail below with respect to FIG. 4. Furthermore, the first threading 150 and/or the second threading 160 may or may not begin precisely at the first fitting end 126 and the second fitting end 128, respectively. For example, in the present aspect, each of the first threading 150 and the second threading 160 can begin a distance from the first fitting end 126 and the second fitting end 128, respectively, as described in further detail below with respect to FIG. 4. Other aspects of the fitting body 120 may define the first threading 150 or second threading 160 only. Furthermore, in other aspects of the fitting body 120, the first threading 150 and/or the second threading 160 can be external threading (i.e., male threading) defined by the fitting outer surface 124.

Example aspects of the tight-seal coupling 110 can further comprise one or more seals 170 oriented within the interior channel 130. For example, in the present aspect, the tight-seal coupling 110 can comprise a first seal 170a and a second seal 170b. The first seal 170a can be configured to abut a first flange wall 442 (shown in FIG. 4) of the inner flange 140. The first flange wall 442 can substantially face towards the first fitting end 126 and can retain the first seal 170a in position within the interior channel 130. Similarly, the second seal 170b can be configured to abut a second flange wall 444 (shown in FIG. 4) of the inner flange 140, wherein the second flange wall 444 can be oriented substantially opposite the first flange wall 442. The second flange wall 444 can substantially face towards the second fitting end 128 and can retain the second seal 170b in position within the interior channel 130. In example aspects, the first and second seals 170a,170b can be any suitable mechanical seal known in the art, such as, for example, gaskets, as shown, O-rings, or the like. The first and second seals 170a,170b can be substantially disk-shaped in the present aspect. Furthermore, example aspects of the first and second seals 170a,170b can be formed from a resilient material, such as, for example, rubber. Other aspects of the first seal 170a and/or the second seal 170b can comprise any other suitable material, including, but not limited to, silicone, neoprene, and the like.

Figure 3:
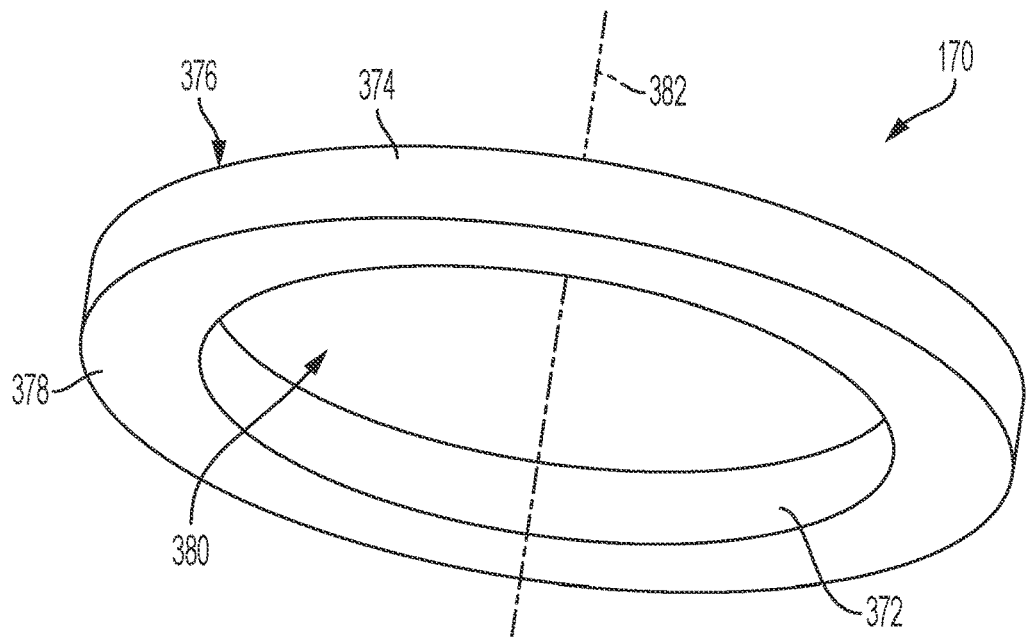
FIG. 3 is a perspective view of one of the seals of FIG. 1.

FIG. 3 illustrates a perspective view of one of the seals 170, according to an example aspect of the present disclosure. As shown, the seal 170 can be disk-shaped in the present aspect, and can define a substantially cylindrical seal inner surface 372 and a substantially cylindrical seal outer surface 374 opposite the seal inner surface 372. The seal inner surface 372 can define a seal opening 380, and a seal axis 382 can extend through a center of the seal opening 380. The seal can further define an annular first seal wall 376 extending between the seal inner surface 372 and the seal outer surface 374 and an annular second seal wall 378 opposite the first seal wall 376 end extending between the seal inner surface 372 and the seal outer surface 374. Each of the first seal wall 376 and the second seal wall 378 can be substantially planar in the present aspect. However, other aspects of the first and/or second seal walls 376, 378 may not be planar. Each of the seal inner surface 372, seal outer surface 374, first seal wall 376, and second seal wall 378 can be substantially smooth, as shown in the present aspect. In other aspects, however, some or all of the seal inner surface 372, seal outer surface 374, first seal wall 376, and second seal wall 378 can be textured or otherwise non-smooth.

Figure 4:
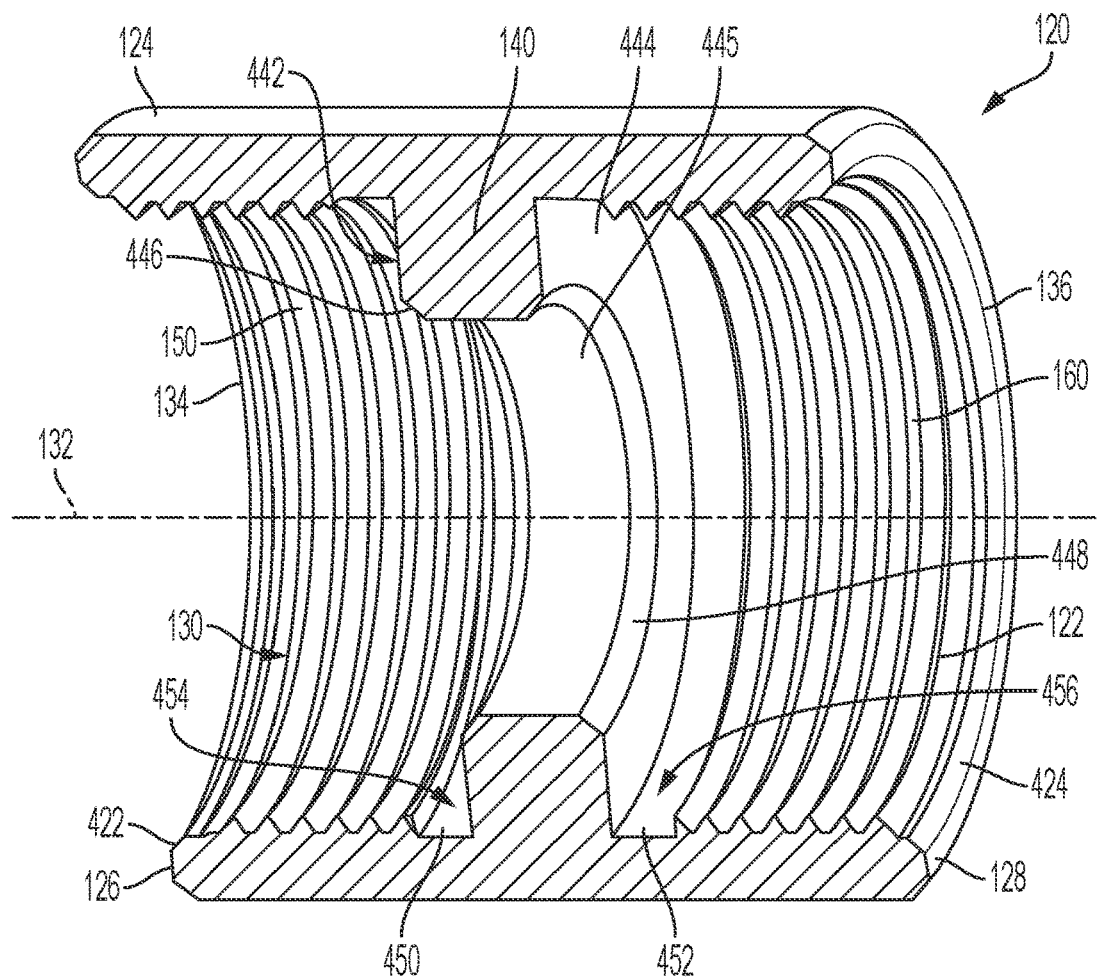
FIG. 4 is a cross-sectional view of the fitting body of FIG. 1 taken along line 4-4 of FIG. 1.

FIG. 4 illustrates a cross-sectional view of the fitting body 120 taken along line 4-4 of FIG. 1, in accordance with an example aspect of the present disclosure. As shown, the fitting body 120 can define the fitting outer surface 124, the fitting inner surface 122, the first fitting end 126, and the second fitting end 128. The fitting inner surface 122 can define the interior channel 130 extending from the first fitting end 126 to the second fitting end 128, and the fitting axis 132 can be defined through a center of the interior channel 130. The first opening 134 of the fitting body 120 can allow access to the interior channel 130 at the first fitting end 126, and the second opening 136 of the fitting body 120 can allow access to the interior channel 130 at the second fitting end 128. The inner flange 140 can extend radially inward into the interior channel 130 from the fitting inner surface 122, relative to the fitting axis 132.

According to example aspects, the first threading 150 can extend substantially from the first fitting end 126 towards the inner flange 140, and the second threading 160 can extend substantially from the second fitting end 128 towards the inner flange 140. In some example aspects, either or both of the first threading 150 and second threading 160 may be spaced axially inward from the first fitting end 126 and the second fitting end 128, respectively, by a small distance. However, in other aspects, the first threading 150 and/or second threading 160 can begin precisely at the first fitting end 126 and second fitting end 128, respectively. As shown, in the present aspect, the fitting inner surface 122 can define a first end chamfer 422 between the first fitting end 126 and the first threading 150 and a second end chamfer 424 between the second fitting end 128 and the second threading 160. The first and second end chamfers 422,424 can allow for easier insertion of the first and second connecting piping components 600a,600b, respectively, into the interior channel 130, as shown and described in further detail with respect to FIGS. 6 and 7.

Figure 6:
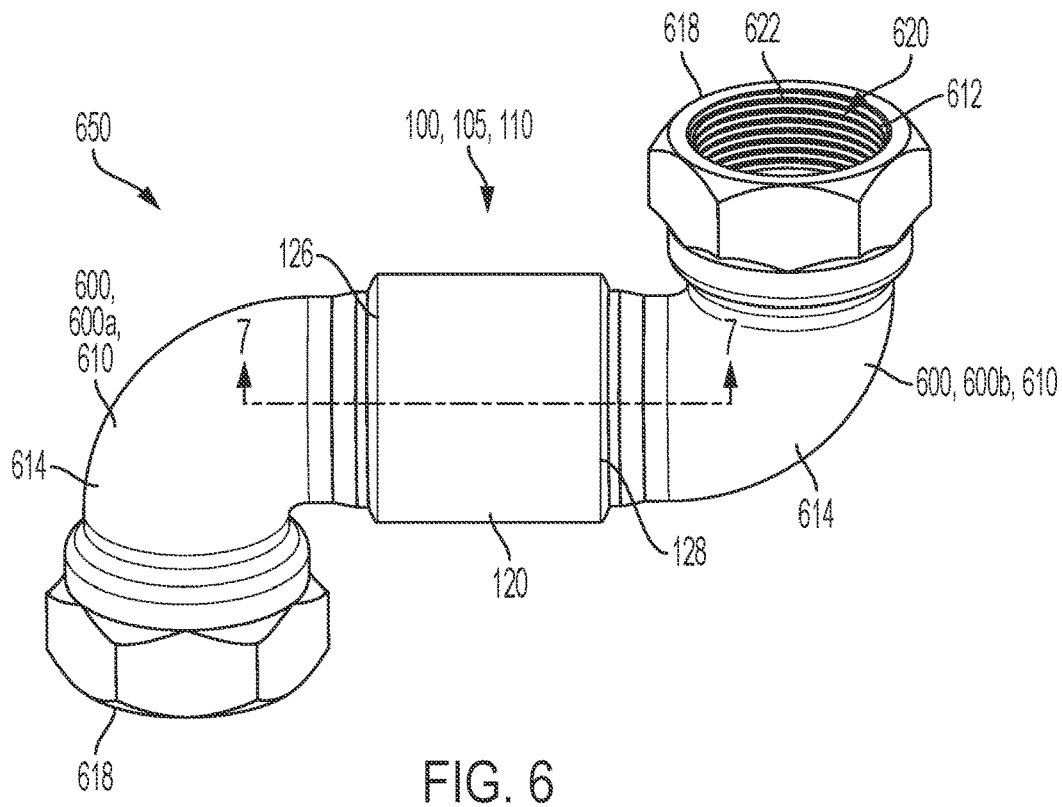
FIG. 6 is a perspective view of the tight-seal coupling of FIG. 1 assembled with a pair of connecting piping components.

As shown, each of the first threading 150 and second threading 160 can be internal threading and can be configured to rotationally mate with external threading 712 (shown in FIG. 7) of the corresponding first and second connecting piping components 600a,600b (shown in FIG. 6). Furthermore, either or both of the first threading 150 and the second threading 160 can be straight threading and can extend in a substantially radially inward direction, relative to the fitting axis 132. That is, the first and second threading 150,160 can extend in a direction about perpendicular to the fitting axis 132. When values are expressed as approximations, by use of the antecedent "about," it will be understood that the particular value can fall within range of industry-standard tolerances. For example, in some aspects, "about perpendicular" can mean between about 89° and 91°. In the present aspect, the first and second threading 150,160 can be oriented at about 90° relative to the fitting axis 132. Additionally, as shown, example aspects of the first and second threading 150,160 can define a substantially triangular cross-sectional shape, as shown.

The straight threading of the first and second threading 150,160 of the tight-seal piping component 100 can provide advantages over angled or tapered threading in some aspects. For example, many existing connecting piping components (including the connecting piping components 600) define straight threading, and the tight-seal piping component 100 can be configured to mate with any suitable connecting piping component that also defines straight threading, including connecting piping components made by other manufacturers. Thus, there is no adapter required to connect the present tight-seal piping component 100 to a connecting piping component that also comprising straight threading, which can save labor time, labor cost, and materials cost. Additionally, straight threading is reliably easy to rotationally engage with other straight threading, as all straight threading extends in a direction about perpendicular (e.g., about 90°) to a corresponding rotational axis. On the other hand, the angle of tapered threading relative to the rotational axis can vary, and thus, the angle of threading for two separate components may not match. For example, it would be difficult to rotationally engage threading angled at about 87° with threading angled at about 89°. The angle of tapered threading can vary due to a variety of factors, including but not limited to, producing the tapered threading of varying components at different angles, difficulty in producing the tapered threading to a desired angle, and/or manufacturing tolerances. Thus, in aspects wherein the threading of a piping component is angled differently than the threading of a connecting piping component, even just slightly, the piping component may not be able to properly couple to the connecting piping component, and leaking between the piping component and connecting piping component can occur. In other aspects, however, the first threading 150 and/or the second threading 160 of the tight-seal piping component 100 can be angled relative to the fitting inner surface 122 towards either the first fitting end 126 or the second fitting end 128.

As shown, the inner flange 140 can extend into the interior channel 130 approximately centrally between the first fitting end 126 and the second fitting end 128. The inner flange 140 can define the first flange wall 442 and the second flange wall 444 opposite the first flange wall 442. Each of the first flange wall 442 and second flange wall 444 can be substantially annular and can extend substantially radially inward from the fitting inner surface 122 in the present aspect. The inner flange 140 can further define a substantially cylindrical flange inner surface 445 extending between the first flange wall 442 and the second flange wall 444 distal to the fitting inner surface 122. The flange inner surface 445 can extend substantially in the axial direction, relative to the fitting axis 132, as shown. Some aspects of the inner flange 140 can define a first flange chamfer 446 between the first flange wall 442 and the flange inner surface 445 and a second flange chamfer 448 between the second flange wall 444 and the flange inner surface 445. Other aspects of the inner flange 140 may not define the first and second flange chamfers 446,448. Each of the first flange wall 442 and second flange wall 444 can be substantially planar in the present aspect. However, in other aspects, the first and/or second flange walls 442,444 may not be planar. Additionally, each of the first and second flange walls 442,444 can be substantially annular in the present aspect. In other aspects, the first flange wall 442 and/or or the second flange wall 444 may not be annular. For example, in other aspects, the first and/or second flange wall 442,444 can alternatively define one or more segments or projections extending radially inward from the fitting inner surface 122. According to example aspects, each of the first flange wall 442, second flange wall 444, and flange inner surface 445 can be substantially smooth in the present aspect, though in other aspects, some or all of the first flange wall 442, second flange wall 444, and flange inner surface 445 can be textured or otherwise non-smooth.

As described, each of the first threading 150 and the second threading 160 can terminate a distance from the inner flange 140. In the present aspect, the fitting inner surface 122 can define a substantially cylindrical first groove surface 450 extending between the first threading 150 and the first flange wall 442 of the inner flange 140. The fitting inner surface 122 can further define a substantially cylindrical second groove surface 452 between the second threading 160 and the second flange wall 444 of the inner flange 140. The first groove surface 450 can define a first seal groove 454 within which the first seal 170a (shown in FIG. 1) can be configured to seat, and the second groove surface 452 can define a second seal groove 456 within which the second seal 170b (shown in FIG. 1) can be configured to seat. Each of the first and second seal grooves 454,456 can be substantially smooth in the present aspect; however, in other aspects, the first seal groove 454 and/or second seal groove 456 may be textured or otherwise non-smooth. Furthermore, other aspects of the fitting body 120 may or may not define the first seal groove 454 and/or the second seal groove 456. In some aspects, as shown, an outer diameter of each of the first and second seal grooves 454,456 can be greater than an inner diameter of the corresponding first and second threading 150,160, respectively, to aid in retaining the corresponding first and second seals 170a,b within the first and second seal grooves 454,456.

Figure 5:
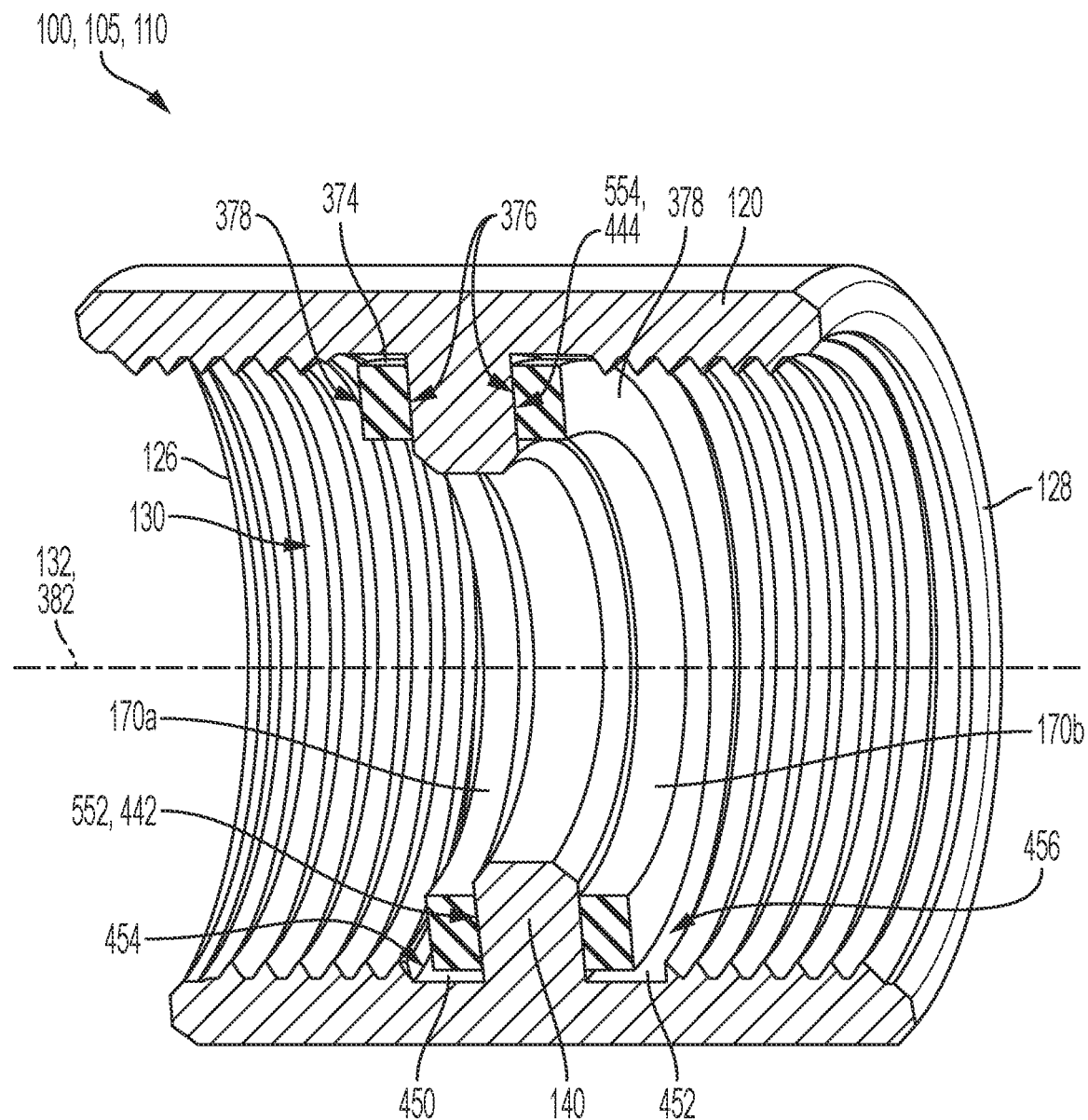
FIG. 5 is a cross-sectional view of the tight-seal coupling of FIG. 1 taken along line 4-4 of FIG. 1.

FIG. 5 illustrates a cross-section view of the tight-seal coupling 110 taken along line 4-4 of FIG. 1. The tight-seal coupling 110 can comprise the fitting body 120, the first seal 170a, and the second seal 170b. As shown, the first seal 170a can be configured to seat within the first seal groove 454, and the second seal 170b can be configured to seat within the second seal groove 456. Specifically, in some aspects, the cylindrical seal outer surface 374 of each of the first seal 170a and the second seal 170b can be configured to engage the corresponding first groove surface 450 and second groove surface 452, respectively. In other aspects, as shown, the seal outer surface 374 may not engage or may only partially engage the corresponding first and second groove surfaces 450,452. As shown, when the first and second seals 170a,170b are assembled with the fitting body 120, the seal axis 382 of each of the first and second seals 170a,170b can be substantially coaxial with the fitting axis 132. According to example aspects, the first seal wall 376 of each of the first seal 170a and the second seal 170b can be configured to abut and lie substantially flat against the corresponding first flange wall 442 and second flange wall 444, respectively, of the inner flange 140. Thus, the first flange wall 442 can serve as a first seal stop surface 542 for the first seal 170a, and the second flange wall 444 can serve as a second seal stop surface 544 for the second seal 170b. The first and second seal stop surfaces 542,544 can aid in retaining the first and second seals 170a,170b in position within the interior channel 130 and can prevent the first and second seals 170a,170b from advancing through the interior channel 130 past the inner flange 140. Furthermore, as shown, the second seal wall 378 of the first seal 170a can face towards the first fitting end 126 of the fitting body 120, and the second seal wall 378 of the second seal 170b can face towards the second fitting end 128 of the fitting body 120. As described in further detail below with respect to FIG. 7, the first connecting piping component 600a (shown in FIG. 6) can be configured to engage the second seal wall 378 of the first seal 170a, and the second connecting piping component 600b (shown in FIG. 6) can be configured to engage the second seal wall 378 of the second seal 170b.

FIG. 6 illustrates the tight-seal coupling 110 assembled with the first and second connecting piping components 600a,600b to define a tight-seal piping assembly 650. As shown, in the present aspect, each of the first and second connecting piping components 600a,600b can be an elbow fitting 610. In other aspects, either or both of the first and second connecting piping components 600a,600b can be any other suitable connecting piping component 600 known in the art. The first and second connecting piping components 600a,600b can each generally define an inner piping surface 612, an outer piping surface 614 opposite the inner piping surface 612, a first piping end 616 (shown in FIG. 7), and a second piping end 618 opposite the first piping end 616. The inner piping surface 612 can define a piping channel 620 extending from the first piping end 616 to the second piping end 618. The first connecting piping component 600a can be coupled to the first fitting end 126 of the fitting body 120 at its first piping end 616, and the second connecting piping component 600b can be coupled to the second fitting end 128 of the fitting body 120 at its first piping end 616. According to example aspects, the interior channel 130 (shown in FIG. 1) of the tight-seal coupling 110 can be in fluid communication with the piping channel 620 of each of the first and second connecting piping components 600a, 600b. Furthermore, in some aspects, one or both of the first and second connecting piping components 600a,600b can define threading 622 at the corresponding second piping end 618 thereof. The threading 622 can be internal threading or external threading. Additionally, the threading 622 can be straight threading or tapered threading.

Figure 7:
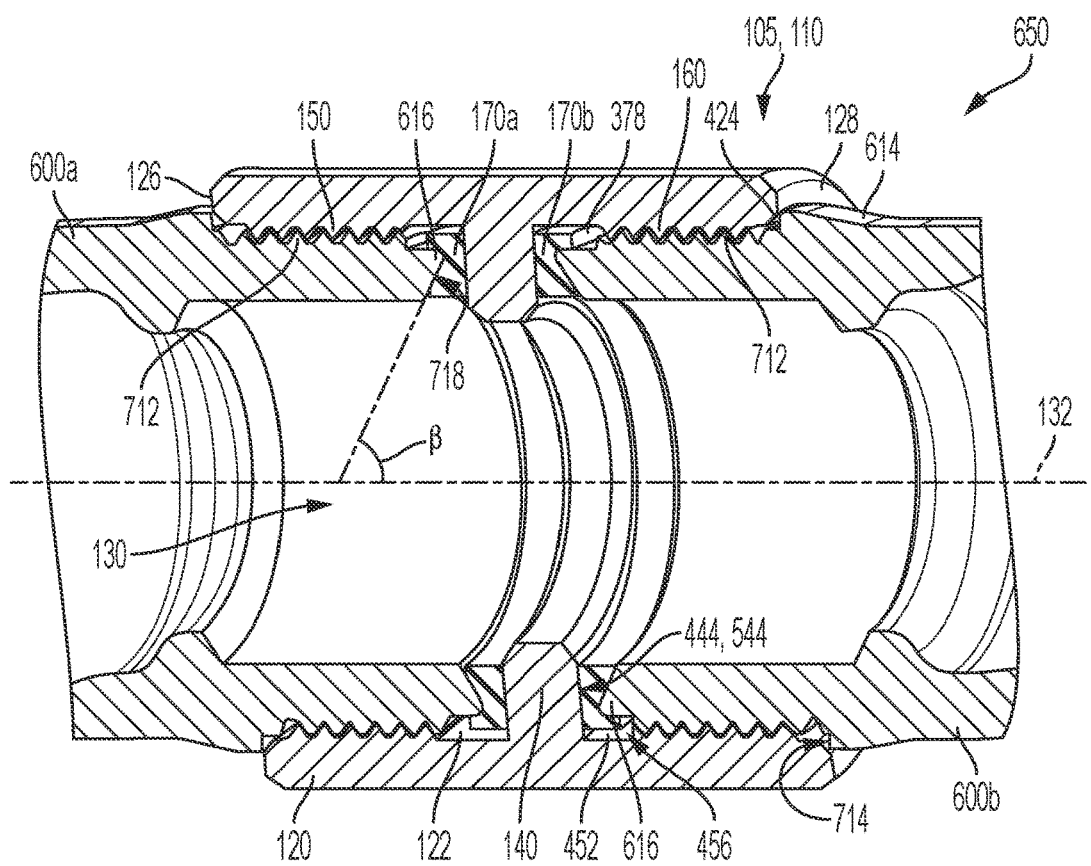
FIG. 7 is a detail cross-sectional view of the tight-seal coupling of FIG. 1 and the pair of connecting piping components of FIG. 6 taken along line 7-7 of FIG. 6.

FIG. 7 illustrates a detail cross-sectional view of the tight-seal piping assembly 650 of FIG. 6 taken along line 7-7 in FIG. 6. As shown, the first piping end 616 of the first connecting piping component 600a can extend into the interior channel 130 of the fitting body 120 of the tight-seal coupling 110 at the first fitting end 126 thereof. Similarly, the first piping end 616 of the second connecting piping component 600b can extend into the interior channel 130 of the fitting body 120 at the second fitting end 128 thereof. According to example aspects, either or both of the first and second connecting piping components 600a,b can taper inwards from the outer piping surface 614 to the inner piping surface 612 at the corresponding first piping ends 616 thereof. Thus, either or both of the first and second connecting piping components 600a,b can define a pipe engagement surface 718 oriented at an acute angle β relative to the fitting axis 132, as shown. In other aspects, either or both of the first piping ends 616 can taper outwards from the inner piping surface 612 to the outer piping surface 614, and the corresponding pipe engagement surface 718 can be oriented at an obtuse angle relative to the fitting axis 132. In other aspects, either or both of the first piping ends 616 of may not be tapered and the corresponding pipe engagement surface 718 can be oriented about perpendicular to the fitting axis 132.

In the present aspect, the outer piping surface 614 of each of the first and second connecting piping components 600a, 600b can define external threading 712 generally at or proximate to the corresponding first piping end 616 thereof. The external threading 712 at the first piping end 616 of the first connecting piping component 600a can rotationally engage the internal first threading 150 of the fitting body 120 to couple the tight-seal coupling 110 to the first connecting piping component 600a. Similarly, the external threading 712 at the first piping end 616 of the second connecting piping component 600b can rotationally engage the internal second threading 160 of the fitting body 120 to couple the tight-seal coupling 110 to the second connecting piping component 600b. According to example aspects, the external threading 712 of each of the first and second connecting piping components 600a,600b can be straight threading. That is, the external threading 712 can extend substantially in a substantially radially outward direction relative to the fitting axis 132 (i.e., a direction perpendicular to the fitting axis 132). As previously mentioned, the first threading 150 and the second threading 160 of the fitting body 120 can also be straight threading, allowing for easy coupling of the tight-seal fitting 105 to the first and second connecting piping components 600a,600b. In other aspects, however, wherein the first threading 150 and/or second threading 160 can be angled relative to the fitting inner surface 122, the external threading 712 of the first connecting piping component 600a and second connecting piping component 600b can be correspondingly angled relative to the outer piping surface 614 to easily mate with the first and second threading 150,160.

Referring to the second connecting piping component 600b as an example, the tight-seal coupling 110 can be tightened onto the second connecting piping component 600b by rotating the tight-seal coupling 110 about the fitting axis 132 relative to the second connecting piping component 600b (or vice versa) to increasingly thread the second threading 160 with the corresponding external threading 712. As the tight-seal coupling 110 is rotated, the first piping end 616 of the second connecting piping component 600b can be advanced through the interior channel 130 of the fitting body 120 towards the second seal 170b. The tight-seal coupling 110 can be tightened until the pipe engagement surface 718 of the first piping end 616 engages and compresses the second seal 170b between the first piping end 616 and the second flange wall 444 (i.e., the second seal stop surface 544) of the inner flange 140. Specifically, the first piping end 616 can engage and press against the second seal wall 378 of the second seal 170b, which can face towards the second fitting end 128 of the fitting body 120. In some aspects, the compressed second seal 170b may expand radially and may engage the second groove surface 452, or a portion thereof, of the second seal groove 456. Additionally, in some aspects, the tight-seal coupling 110 can be rotated until a piping shoulder 714 of the second connecting piping component 600b abuts the second fitting end 128 and/or the second end chamfer 424 of the fitting body 120, thereby preventing further advancement of the first piping end 616 through the interior channel 130. As shown, in example aspects, the outer piping surface 614 can define the piping shoulder 714 extending substantially radially outward relative to the fitting axis 132.

Compressing the second seal 170b between the second flange wall 444 of the inner flange 140 and the first piping end 616 of the second connecting piping component 600b can create a fluid-tight seal between the fitting body 120 and the second connecting piping component 600b, thereby preventing leaks at the point of connection between the tight-seal coupling 110 and the second connecting piping component 600b. According to example aspects, the tight-seal coupling 110 can be tightened onto the first connecting piping component 600a in substantially the same manner to create a fluid-tight seal therebetween.

Figure 8:
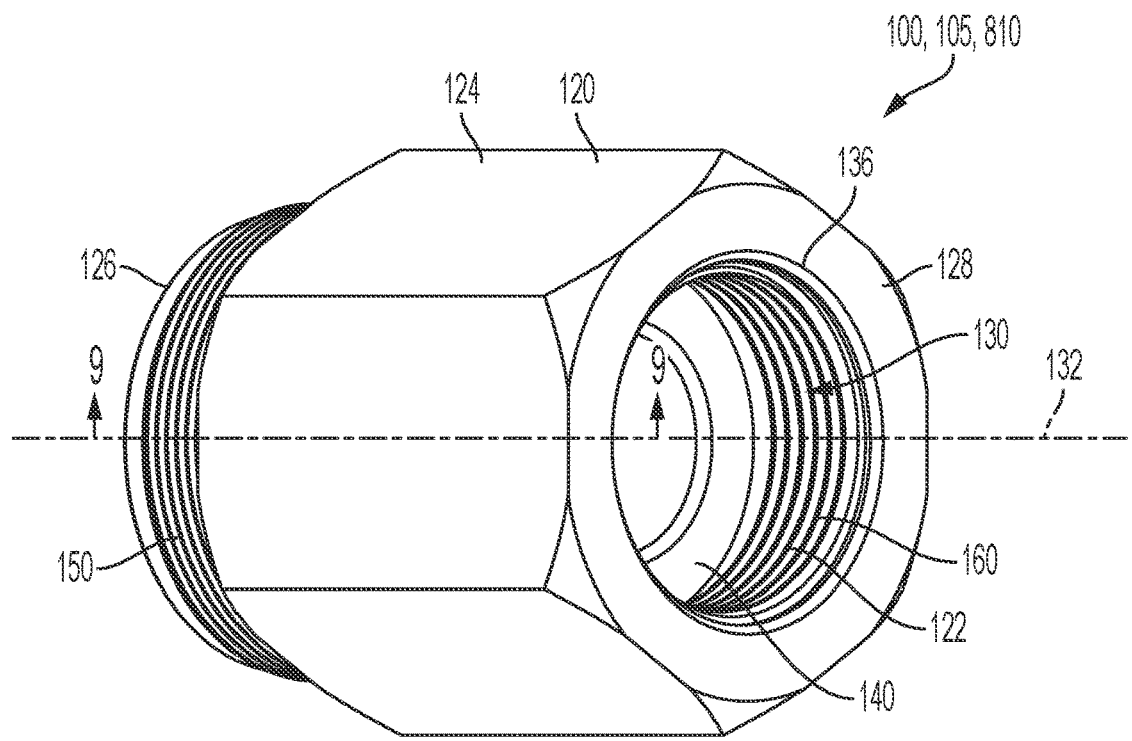
FIG. 8 is a right perspective view of a tight-seal adapter, in accordance with another aspect of the present disclosure.

FIG. 8 illustrates the tight-seal fitting 105 according to another aspect of the present disclosure. In the present aspect, the tight-seal fitting 105 can be a tight-seal adapter 810. As shown, the tight-seal adapter 810 can comprise the fitting body 120. The fitting body 120 can define the fitting outer surface 124 and the fitting inner surface 122 opposite the fitting outer surface 124. In the present aspect, the fitting outer surface 124 or a portion thereof can define a substantially hexagonal cross-section, though in other aspects, the fitting outer surface 124 can define any other suitable shape. The fitting body 120 can further define the first fitting end 126 and the second fitting end 128 opposite the first fitting end 126. The fitting inner surface 122 can define the interior channel 130 extending from the first fitting end 126 to the second fitting end 128, and the fitting axis 132 can be defined through the center of the interior channel 130. The first opening 134 (shown in FIG. 9) can allow access to the interior channel 130 at the first fitting end 126, and the second opening 136 can allow access to the interior channel 130 at the second fitting end 128. The interior channel 130 can be substantially cylindrical in the present aspect, though other aspects of the interior channel 130 can define any other suitable shape. According to example aspects, the first and second connecting piping components 600a,600b (shown in FIG. 6) can be connected to the tight-seal coupling 110 at each of the first and second fitting ends 126,128, respectively. The first and/or second connecting piping components 600a,600b can be elbow fittings 610, as shown in FIG. 6, for example, or can be any other suitable connecting piping components 600 known in the art.

As shown, the fitting inner surface 122 can define the inner flange 140 extending substantially radially inward relative to the fitting axis 132. In the present aspect, the inner flange 140 can be oriented closer to the second fitting end 128 than the first fitting end 126. In other aspects, the inner flange 140 can be oriented substantially centrally between the first fitting end 126 and the second fitting end 128 or can be oriented closer to the first fitting end 126. The fitting body 120 can further define the second threading 160 at or near the second fitting end 128. The second threading 160 can be defined by the fitting inner surface 122, such that the second threading 160 can be internal threading, and can extend substantially from second fitting end 128 towards the inner flange 140. The second threading 160 may or may not extend fully to the inner flange 140. For example, in the present aspect, the second threading 160 can terminate a distance from the inner flange 140, as described in further detail below with respect to FIG. 9.

The fitting body 120 can also define the first threading 150 at or near the first fitting end 126. However, unlike the first threading 150 of the aspect of FIGS. 1-7, the first threading 150 of the present aspect can be defined by the fitting outer surface 124, such that the first threading 150 can be external threading. In other aspects, the first threading 150 can be internal threading and/or the second threading 160 can be external threading. Furthermore, the first threading 150 and/or the second threading 160 may or not begin precisely at the first fitting end 126 and the second fitting end 128, respectively. For example, in the present aspect, the first threading 150 and the second threading 160 can begin a distance from the first fitting end 126 and the second fitting end 128, respectively, as described in further detail below with respect to FIG. 9. In some aspects, two or more of the tight-seal piping components 100 can be configured to connect to one another. For example, according to example aspects, the external first threading 150 of the tight-seal adapter 810 can be configured to mate with the internal second threading 160 of another one of the tight-seal adapters 810, or with the straight internal threading of any of the tight-seal piping components 100.

Figure 9:
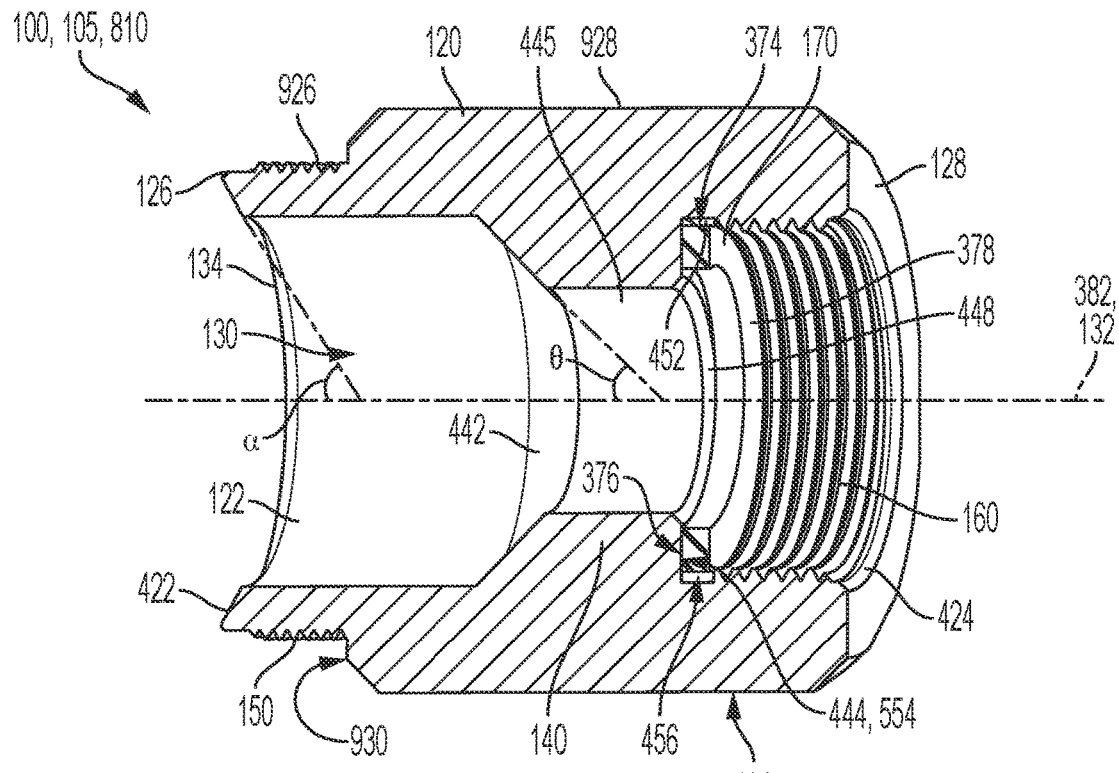
FIG. 9 is a cross-sectional view of the tight-seal adapter of FIG. 8 taken along line 9-9 of FIG. 8.

Example aspects of the tight-seal adapter 810 can further comprise one of the seals 170 (shown in FIG. 9). Other aspects of the tight-seal adapter 810 can comprise additional seals 170. The seal 170 is not shown in the present view so that the inner flange 140 can be clearly shown; however, the seal 170 is shown assembled with the fitting body 120 in FIG. 9. The seal 170 can be configured to abut the second flange wall 444 of the inner flange 140, which can substantially face towards the second fitting end 128 and can retain the seal 170 in position and prevent the seal 170 from advancing through the interior channel 130 towards the first fitting end 126. The seal 170 can be substantially similar to the gasket-style seal illustrated in FIG. 3. However, in other aspects, the seal 170 can be any suitable mechanical seal known in the art.

FIG. 9 illustrates a cross-sectional view of the tight-seal adapter 810 comprising the fitting body 120 and the seal 170. As shown, the fitting outer surface 124 of the fitting body 120 can define a first outer portion 926 proximate to the first fitting end 126 and a second outer portion 928 proximate to the second fitting end 128. The first outer portion 926 can define a substantially circular cross-section, and the second outer portion 928 can define a substantially hexagonal cross-section. The fitting outer surface 124 can further define an outer shoulder 930 extending substantially radially inward, relative to the fitting axis 132, from the second outer portion 928 to the first outer portion 926.

According to example aspects, the first outer portion 926 of the fitting outer surface 124 can define the first threading 150 extending generally between the first fitting end 126 and the outer shoulder 930. In the present aspect, the first threading 150 can be spaced axially inward from the first fitting end 126 by a distance. However, in other aspects, the first threading 150 can begin precisely at the first fitting end 126. In the present aspect, the first threading 150 can be straight threading, which can extend in a substantially radially outward direction relative to the fitting axis 132 (i.e., a direction about perpendicular to the fitting axis 132). Other aspects of the first threading 150 can be tapered threading.

According to example aspects, the external first threading 150 can be configured to rotationally mate with internal threading (not shown) of the first connecting piping component 600a (shown in FIG. 6) to couple the tight-seal adapter 810 to the first connecting piping component 600a. In other aspects, as described above, the external first threading 150 can be configured to rotationally mate with the internal threading of any of the tight-seal piping components 100. In some aspects, the tight-seal adapter 810 can be rotated relative to first connecting piping component 600a (or vice versa), until the first piping end 616 (shown in FIG. 7) of the first connecting piping component 600a abuts the outer shoulder 930 of the fitting body 120, the fitting body 120 can define the first end chamfer 422 substantially between the first fitting end 126 and the fitting inner surface 122. In some aspects, as shown, the first end chamfer 422 can be formed similar to the pipe engagement surfaces 718 (shown in FIG. 7) of the first and second piping components 600a,b (shown in FIG. 6). For example, as shown, the fitting body 120 can taper inwards from the fitting outer surface 124 to the fitting inner surface 122 at the corresponding first fitting end 126 thereof, such that the first end chamfer 422 can be oriented at an acute angle α relative to the fitting axis 132, as shown. In some aspects, the angle α can be about equal to or equal to the angle β (shown in FIG. 7), though in other aspects, the angles α and β can differ. The angled first end chamfer 422 can be configured to engage a corresponding one of the seals 170 when coupled to another one of tight-seal piping components 100. In other aspects, the first fitting end 126 can taper outwards from the fitting inner surface 122 to the fitting outer surface 1244, such that the corresponding first end chamfer 422 can be oriented at an obtuse angle relative to the fitting axis 132. In other aspects, first fitting end 126 may not be tapered.

The second threading 160 can be defined by the fitting inner surface 122, and can extend substantially from the second fitting end 128 towards the inner flange 140. In the present aspect, the second threading 160 can be spaced axially inward from the second fitting end 128 by a distance. In other aspects, the second threading 160 can begin precisely at the second fitting end 128. As shown, the fitting inner surface 122 can define the second end chamfer 424 between the second fitting end 128 and the second threading 160, which can allow for easier insertion of the second connecting piping component 600b (shown in FIG. 6), such as the elbow fitting 610 of FIG. 6, into the interior channel 130. According to example aspects, the internal second threading 160 can be configured to rotationally mate with the external threading 712 (shown in FIG. 7) of the second connecting piping component 600b. In other aspects, the second connecting piping component 600b can be any other suitable connecting piping component 600 known in the art comprising external threading. According to example aspects, the second threading 160 can be straight threading, which can extend in a substantially radially inward direction relative to the fitting axis 132 (i.e., a direction about perpendicular to the fitting axis 132).

According to example aspects, the inner flange 140 can extend into the interior channel 130 from the fitting inner surface 122. In the present aspect, the inner flange 140 can be oriented closer to the second fitting end 128 than the first fitting end 126. The inner flange 140 can define the first flange wall 442, the second flange wall 444, and the flange inner surface 445 extending therebetween distal to the flange inner surface 445. The flange inner surface 445 can be substantially cylindrical in the present aspect and can extend substantially in the axial direction, relative to the fitting axis 132. In other aspects, the flange inner surface 445 can define any other suitable shape and/or can extend in any suitable direction. Each of the first flange wall 442 and second flange wall 444 can be substantially annular and can extend substantially radially inward, relative to the fitting axis 132, from the fitting inner surface 122. In the present aspect, the second flange wall 444 can be oriented about orthogonal to the fitting axis 132, while the first flange wall 442 can be oriented at an acute angle θ relative to the fitting axis 132. In other aspects, the first flange wall 442 can be oriented at an obtuse angle relative to the fitting axis 132 or can be oriented about orthogonal to the fitting axis 132. Moreover, in the present aspect, the inner flange 140 can define the second flange chamfer 448 between the second flange wall 444 and the flange inner surface 445. The inner flange 140 does not define the first flange chamfer 446 (shown in FIG. 4) in the present aspect, though other aspects can define the first flange chamfer 446.

According to example aspects, the second threading 160 can terminate a distance from the inner flange 140, and the fitting inner surface 122 can define the substantially cylindrical second groove surface 452 between the second threading 160 and the second flange wall 444 of the inner flange 140. As shown, the second groove surface 452 can define the second seal groove 456 within the interior channel 130, and the seal 170 can be configured to seat within the second seal groove 456. Other aspects of the fitting body 120 may or may not define the second seal groove 456. When the seal 170 is assembled with the fitting body 120, the seal axis 382 thereof can be substantially coaxial with the fitting axis 132. Like the aspect of FIGS. 1-7 described above, the first seal wall 376 of the seal 170 can be configured to abut and lie substantially flat against the second flange wall 444 of the inner flange 140. Thus, the second flange wall 444 can serve as the second seal stop surface 544 for the seal 170. Furthermore, as shown, the second seal wall 378 of the seal 170 can face towards the second fitting end 128 of the fitting body 120. As described above, the first piping end 616 (shown in FIG. 7) of the second connecting piping component 600b can be configured to engage the second seal wall 378 of the seal 170, and the seal 170 can be compressed between the inner flange 140 and the second connecting piping component 600b to create a fluid-tight seal therebetween. Additionally, the seal outer surface 374 of the seal 170 can be configured to fully or partially engage the second groove surface 452, or may not engage the second groove surface 452 at all, before or after being compressed between the second connecting piping component 600b and the inner flange 140.

Figure 10A:
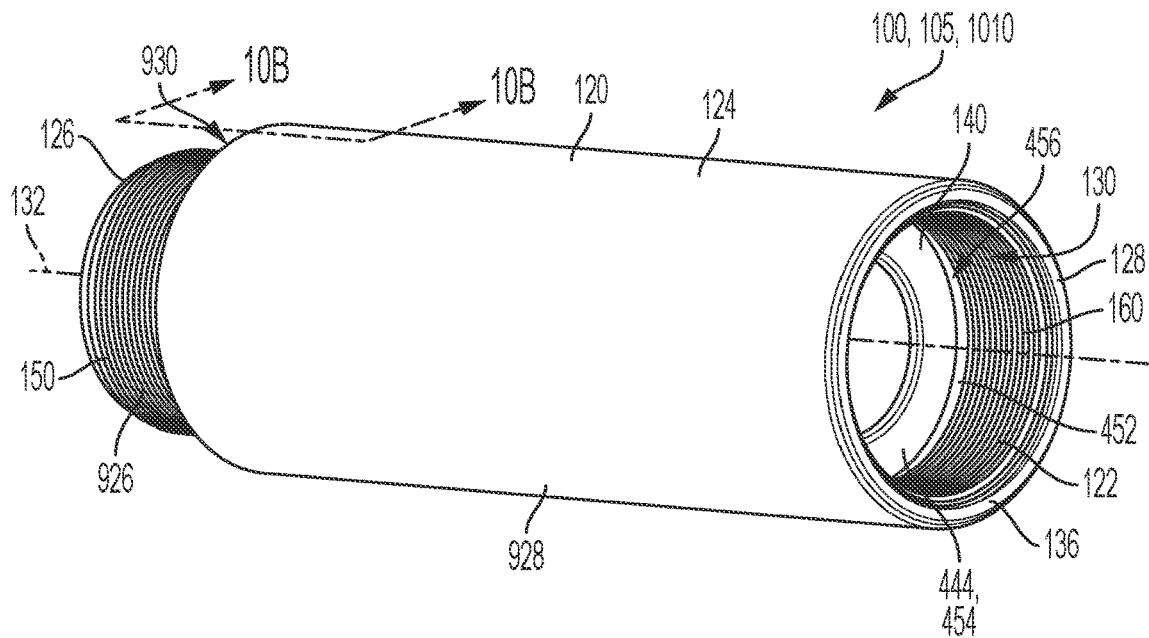
FIG. 10A is a right perspective view of a tight-seal extender, in accordance with another aspect of the present disclosure.

FIG. 10A illustrates the tight-seal fitting 105 according to another aspect of the present disclosure. In the present aspect, the tight-seal fitting 105 can be a tight-seal extender 1010, which can be similar to the tight-seal adapter 810 shown in FIGS. 8 and 9. However, the tight-seal extender 1010 can define a length that can be greater than a length of the tight-seal adapter 810, such that the tight-seal extender 1010 can span a greater distance between a pair of the connecting piping components 600 (shown in FIG. 6). According to example aspects, the tight-seal adapter 810 can comprise the fitting body 120, which can be substantially cylindrical in the present aspect. Other aspects of the fitting body 120 can define any other suitable shape. The fitting body 120 can define the fitting outer surface 124, the fitting inner surface 122, the first fitting end 126, and the second fitting end 128. The fitting inner surface 122 can define the interior channel 130 extending from the first fitting end 126 to the second fitting end 128, and the fitting axis 132 can be defined through the center of the interior channel 130. The first opening 134 (shown in FIG. 1) can allow access to the interior channel 130 at the first fitting end 126, and the second opening 136 can allow access to the interior channel 130 at the second fitting end 128. In example aspects, the first and second connecting piping components 600a,600b (shown in FIG. 6) can be connected to the tight-seal extender 1010 at the first and second fitting ends 126,128. The first and/or second connecting piping components 600a,600b can be any suitable connecting piping components 600 known in the art.

As shown, the fitting inner surface 122 can define the inner flange 140 or an inner shoulder extending substantially radially inward relative to the fitting axis 132. In the present aspect, the inner flange 140 can be oriented closer to the second fitting end 128 than the first fitting end 126. In other aspects, the inner flange 140 can be oriented substantially centrally between the first fitting end 126 and second fitting end 128 or can be oriented closer to the first fitting end 126. Additionally, some aspects of the tight-seal extender 1010 may comprise a second one of the inner flanges 140 or a second inner shoulder proximate to the first fitting end 126 to accommodate for the extended length of the tight-seal extender 1010. Similar to the tight-seal adapter 810, the fitting outer surface 124 of the fitting body 120 can define the first outer portion 926 proximate to the first fitting end 126 and the second outer portion 928 proximate to the second fitting end 128. The fitting outer surface 124 can define the external first threading 150 on the first outer portion 926, between the first fitting end 126 and the outer shoulder 930. The fitting inner surface 122 can define the internal second threading 160 between the second fitting end 128 and the inner flange 140. The first threading 150 and second threading 160 can both define straight threading in the present aspect. However, in other aspects, the first threading 150 and/or the second threading 160 can be tapered threading. Moreover, in other aspects, the first threading 150 can be internal threading and/or the second threading 160 can be external threading. As described above, two or more of the tight-seal piping components 100 can be configured to connect to one another. For example, the external first threading 150 of the tight-seal extender 1010 can be configured to mate with the internal second threading 160 of another tight-seal extender 1010, or with any other of the straight internal threading of the tight-seal piping components 100 disclosed herein.

Example aspects of the fitting inner surface 122 can further comprise the second groove surface 452 between the inner flange 140 and the second threading 160, and the second groove surface 452 can define the second seal groove 456 for receiving the seal 170 (shown in FIG. 1). The seal 170 can be configured to abut the second flange wall 444 (i.e., the second seal stop surface 544) of the inner flange 140, which can substantially face towards the second fitting end 128 and can retain the seal 170 in position and prevent the seal 170 from advancing through the interior channel 130 towards the first fitting end 126. The seal 170 can be substantially similar to the gasket-style seal illustrated in FIG. 3. However, in other aspects, the seal 170 can be any suitable mechanical seal known in the art. The first and second connecting piping components 600a,600b can be coupled to the tight-seal extender 1010 as described above, and the seal 170 can be compressed between the inner flange 140 and the second connecting piping component 600b to create a fluid-tight seal between the tight-seal extender 1010 and the second connecting piping component 600b. According to example aspects, a length of the tight-seal extender 1010 can be greater than a diameter of the tight-seal extender 1010. In some aspects, the length of the tight-seal extender 1010 can be about twice as large, or greater, than the diameter of the tight-seal extender 1010.

Figure 10B:
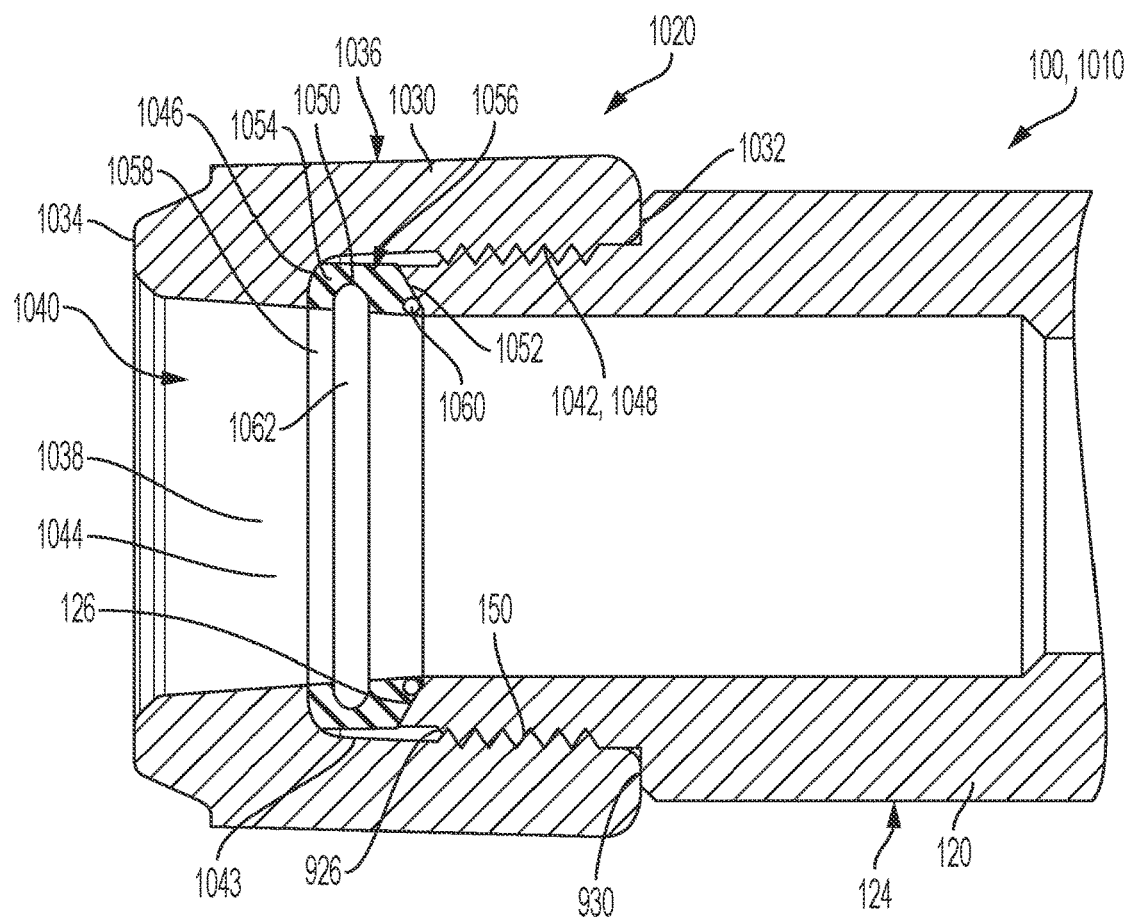
FIG. 10B is a detail cross sectional view of the tight-seal extender of FIG. 10A taken along line 10B-10B in FIG. 10A, wherein a compression nut assembly is disposed on the tight-seal extender.

FIG. 10B illustrates a detail cross-sectional view of the tight-seal extender 1010 taken along line 10B-10B in FIG. 10A. As shown, a compression nut assembly 1020 can be coupled to the first outer portion 926 of the fitting body 120. In other aspects, the compression nut assembly 1020 can be disposed on any of the tight-seal piping components 100, such as, for example, the tight-seal adapter 810 (shown in FIG. 8). The compression nut assembly 1020 can comprise a compression nut 1030 and a gasket 1050. Example aspects of the compression nut 1030 can define a first nut end 1032, a second nut end 1034 opposite the first nut end 1032, a nut outer surface 1036, and a nut inner surface 1038 opposite the nut outer surface 1036. The nut inner surface 1038 can define a nut channel 1040 extending through the compression nut 1030 from the first nut end 1032 to the second nut end 1034. The nut inner surface 1038 can further define a first nut section 1042 adjacent to the first nut end 1032 and a second nut section 1044 adjacent to the second nut end 1034. The first nut section 1042 can define a diameter that can be greater than a diameter of the second nut section 1044, and the nut inner surface 1038 can define a nut shoulder 1046 extending radially inward from the first nut section 1042 to the second nut section 1044. In example aspects, the first nut end 1032 can contact the outer shoulder 930 of the fitting body 120. However, in other aspects, the second nut end 1032 can be spaced from the outer shoulder 930. Example aspects of the first nut section 1042 can define internal nut threading 1048. The internal nut threading 1048 can be straight threading, as shown, and can be configured to engage the straight, external first threading 150 of the fitting body 120. In other aspects, wherein the external threading 150 is tapered threading, the internal nut threading 1048 can be tapered threading. According to example aspects, the first nut section 1042 can further define a smooth portion 1043 extending from the internal nut threading 1048 to the nut shoulder 1046. The smooth portion 1043 can extend beyond the first fitting end 126, such that the nut shoulder 1046 and the second nut section 1044 can be spaced from the first fitting end 126, as shown.

Example aspects of the gasket 1050 can define a first gasket end 1052, a second gasket end 1054 opposite the first gasket end 1052, a gasket outer surface 1056, and a gasket inner surface 1058 opposite the gasket outer surface 1056. The gasket 1050 can be disposed within the nut channel 1040, and the second gasket end 1054 can abut the nut shoulder 1046, as shown. Furthermore, the first gasket end 1052 can abut the first fitting end 126 of the fitting body 120, such that the gasket 1050 can be laterally disposed between the nut shoulder 1046 of the compression nut 1030 and the first fitting end 126. In some aspects, a spring 1060 can be molded into the gasket 1050 at the first gasket end 1052, proximate to the gasket inner surface 1058. In the present aspect, the spring 1060 can be a bronze coil spring; however, in other aspects, the spring 1060 can be any other suitable spring known in the art. Additionally, in some aspects, the gasket inner surface 1058 can define an annular groove 1062, as shown. According to example aspects, one of the connecting piping components 600 (shown in FIG. 6) can be inserted into the nut channel 1040 at the second nut end 1034, and the gasket inner surface 1058 can contact the outer piping surface 614 to create a seal therebetween.

Figure 11:
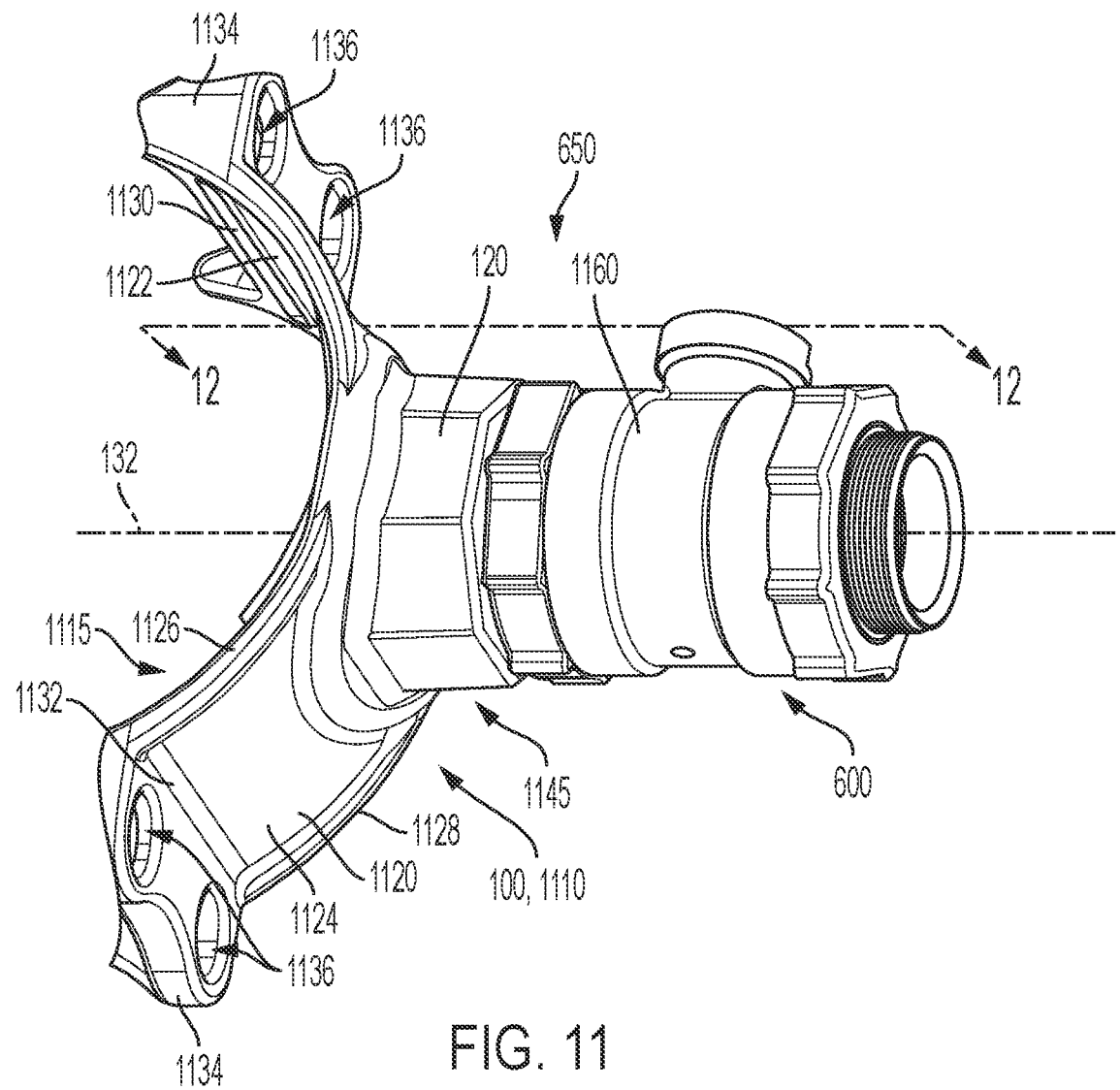
FIG. 11 is a perspective view of a tight-seal saddle assembled with a connecting piping component, in accordance with another aspect of the present disclosure.

FIG. 11 illustrates the tight-seal piping assembly 650 according to another aspect of the present disclosure. The tight-seal piping assembly 650 can comprise the tight-seal piping component 100 and one or more of the connecting piping components 600. In the present aspect, the tight-seal piping component 100 can be a tight-seal saddle 1110. The tight-seal saddle 1110 can be coupled to one of the connecting piping components 600, such as, for example, a corporation valve 1160, as shown. Example aspects of the tight-seal saddle 1110 can be formed from a metal material, such as, for example, steel, and more specifically, stainless steel in some aspects. In other aspects, the tight-seal saddle 1110 can be formed from any other suitable material known in the art, including, but not limited to, other metals, plastics, composites, and the like. According to example aspects, the tight-seal saddle 1110 can comprise a saddle portion 1115 and a fitting portion 1145. The saddle portion 1115 can define a substantially arcuate body 1120. The arcuate body 1120 can define an inner saddle surface 1122 and an outer saddle surface 1124. The arcuate body 1120 can further define a front end 1126, a rear end 1128 opposite the front end 1126, a first lateral side 1130, and a second lateral side 1132 opposite the first lateral side 1130. A lug 1134 can be formed at each of the first lateral side 1130 and the second lateral side 1132, and each of the lugs 1134 can define one or more fastener holes 1136 therethrough.

Figure 12:
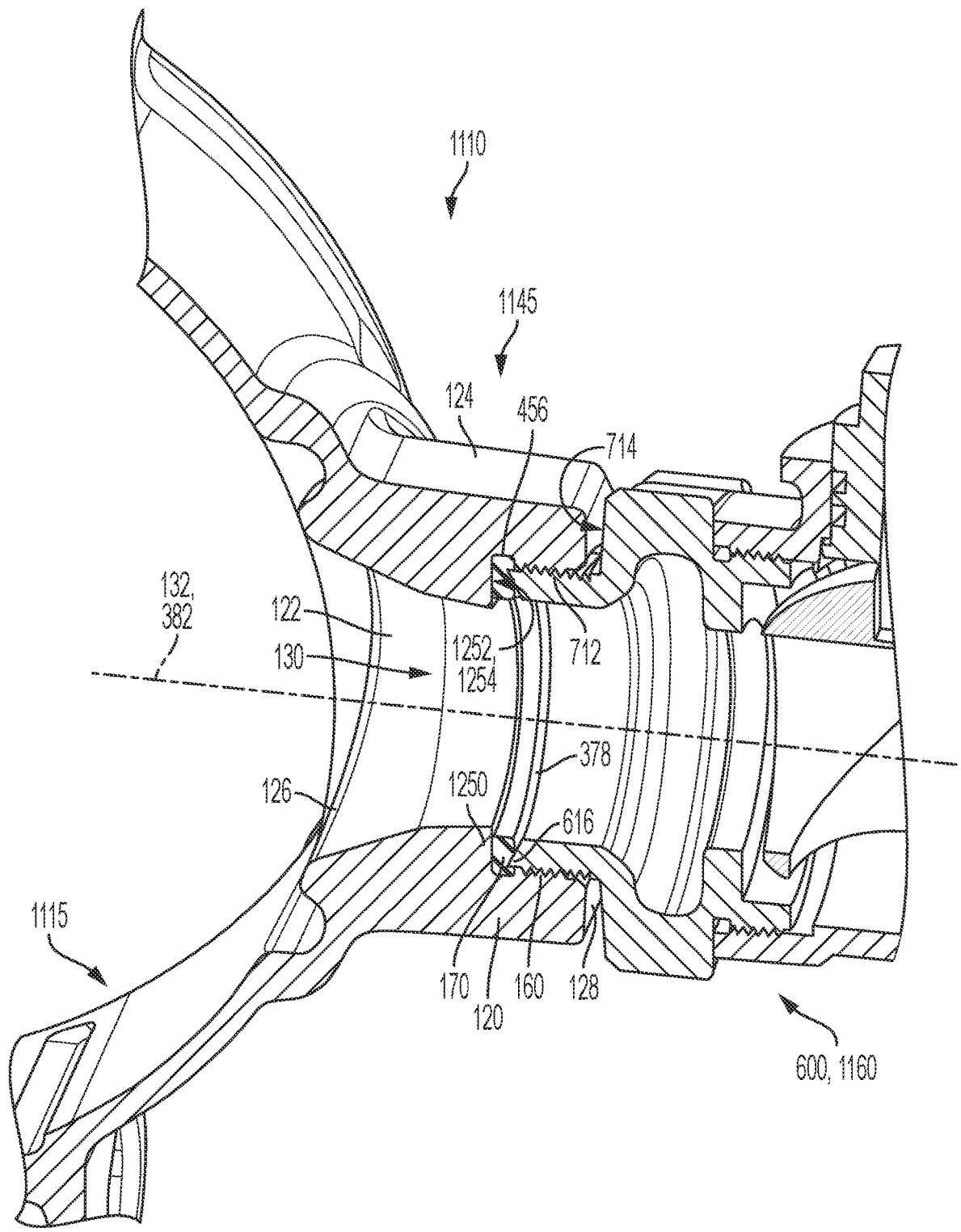
FIG. 12 is a detail cross-sectional view of the tight-seal saddle of FIG. 12 and the connecting piping component of FIG. 12 taken along line 12-12 of FIG. 11.

The fitting portion 1145 can comprise the fitting body 120, according to another example aspect of the present disclosure. FIG. 12 illustrates a detail cross-sectional view of the fitting portion 1145 of the tight-seal saddle 1110 coupled to the connecting piping component 600 (e.g., the corporation valve 1160), taken along line 12-12 in FIG. 11. The fitting body 120 can comprise the fitting outer surface 124, the fitting inner surface 122, the first fitting end 126, and the second fitting end 128. In the present aspect, the fitting portion 1145 can be monolithically joined with the saddle portion 1115 generally at the first fitting end 126 of the fitting body 120 (i.e., the fitting portion 1145 and the saddle portion 1115 can be formed as a singular component). The fitting inner surface 122 can define the interior channel 130 extending from the first fitting end 126 to the second fitting end 128, and the fitting axis 132 can be defined through the center of the interior channel 130. As shown, instead of the inner flange 140 (shown in FIG. 1), the fitting inner surface 122 can define an inner shoulder 1250 extending substantially radially inward. The inner shoulder 1250 can define an annular shoulder wall 1252 that can be oriented about perpendicular to the fitting axis 132.

The fitting inner surface 122 can further define the internal second threading 160 between the second fitting end 128 and the inner shoulder 1250, and can define the second seal groove 456 between the second threading 160 and the inner shoulder 1250. The fitting inner surface 122 does not define the first seal groove 454 (shown in FIG. 4) in the present aspect, but can define the first seal groove 454 in other aspects. The second threading 160 can be configured to rotationally mate with the external threading 712 of the corporation valve 1160. In other aspects, the connecting piping component 600 can be any other suitable connecting piping component 600 known in the art comprising external threading. According to example aspects, the second threading 160 can be straight threading, which can extend in a substantially radially inward direction relative to the fitting axis 132 (i.e., a direction about perpendicular to the fitting axis 132). In the present aspect, the fitting body 120 does not define the first threading 150 (shown in FIG. 1), but can define the first threading 150 in other aspects. As shown, in some aspects, the fitting inner surface 122 can taper outwards generally from the inner shoulder 1250 to the first fitting end 126.

The fitting portion 1145 of the tight-seal saddle 1110 can further comprise the seal 170 received in the second seal groove 456. The seal 170 can be configured to abut the annular shoulder wall 1252 of the inner shoulder 1250, as described in detail above. The annular shoulder wall 1252 can substantially face towards the second fitting end 128 and can retain the seal 170 in position and prevent the seal 170 from advancing through the interior channel 130 towards the first fitting end 126. Thus, the annular shoulder wall 1252 of the inner shoulder 1250 can serve as a seal stop surface 1254 for the seal 170. The seal 170 of the present aspect can be substantially similar to the gasket-style seal illustrated in FIG. 3. However, in other aspects, the seal 170 can be any suitable mechanical seal known in the art. The tight-seal saddle 1110 can be tightened onto the connecting piping component 600 by rotating the tight-seal saddle 1110 relative to the connecting piping component 600 (or vice versa) to increasingly thread the second threading 160 with the corresponding external threading 712. As shown, the first piping end 616 of the connecting piping component 600 can be configured to engage the second seal wall 378 of the seal 170, and the seal 170 can be compressed between the inner shoulder 1250 of the fitting body 120 and the connecting piping component 600 to create a fluid-tight seal therebetween. In some aspects, the tight-seal saddle 1110 can be rotated until the piping shoulder 714 of the connecting piping component 600 abuts the second fitting end 128 of the fitting body 120, thereby preventing further advancement of the first piping end 616 through the interior channel 130.

A method of preventing leaking in the tight-seal piping assembly 650 can comprise inserting the first piping end 616 of one of the connecting piping components 600 within the interior channel 130 of the tight-seal piping component 100. The tight-seal piping component 100 can define the first threading 150, which can be straight internal threading, within the interior channel 130. The connecting piping component 600 can define the external threading 712, which can also be straight threading, proximate to the first piping end 616. The method can further comprise rotationally engaging the first threading 150 of the tight-seal piping component 100 with the external threading 712 of the connecting piping component 600 and advancing the first piping end 616 of the connecting piping component 600 through the interior channel 130 by rotating the tight-seal piping component 100 relative to the connecting piping component 600. Example aspects of the method can further comprise creating a fluid-tight seal between the tight-seal piping component 100 and the connecting piping component 600 by compressing the seal 170 between the first seal stop surface 542 of the tight-seal piping component 100 and the first piping end 616.

Figure 13:
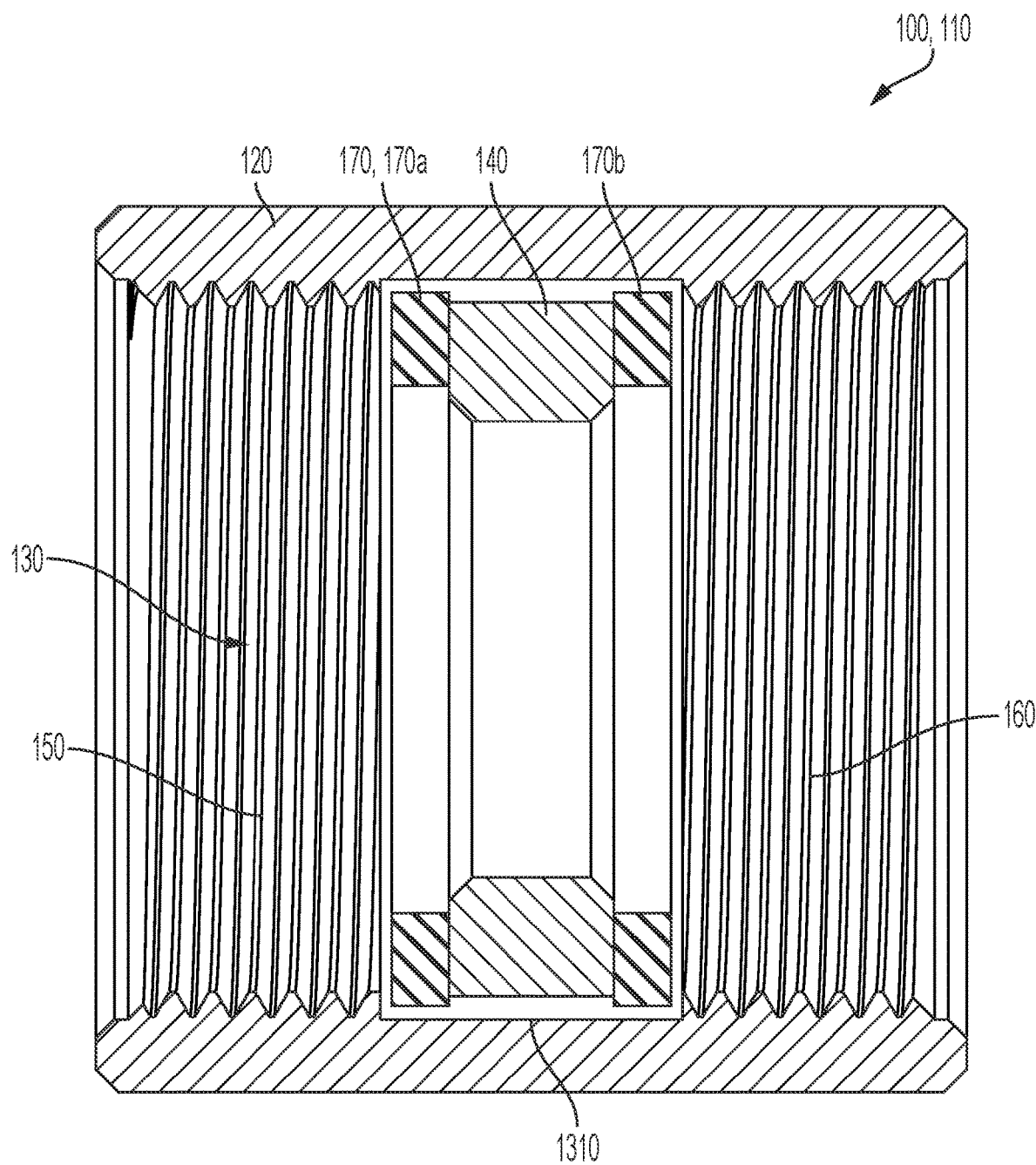
FIG. 13 illustrates the tight-seal coupling in accordance with another aspect of the present disclosure.

FIG. 13 illustrates the tight-seal coupling 110 according to another example aspect of the present disclosure, wherein the inner flange 140 is formed separately from the fitting body 120. In the present aspect, the inner flange 140 can be unattached to the fitting body 120 and can be loose within the interior channel 130. The inner flange 140 can be retained within the interior channel 130 by the first and second seals 170a,b. According to example aspects, instead of the first and second seal grooves 454,456 (shown in FIG. 4), the fitting inner surface 122 can define a singular seal groove 1310 that can extend substantially from the first threading 150 to the second threading 160. As shown, each of the first and second seals 170a,b can define an outer diameter that can be can be greater than the inner diameter of the corresponding first and second threading 150,160, so that the first and second seals 170a,b can be retained within the seal groove 1310 by the first and second threading 150,160. The inner flange 140 can be disposed between the first and second seals 170a,b and can be held within the seal groove 1310 by the first and second seals 170a,b. In other aspects, the inner flange 140 can be formed separately from the fitting body 120 of any of the other the tight-seal piping components 100. Furthermore, in other aspects, the inner flange 140 can be formed separately from the fitting body 120 but can be attached thereto by any suitable fastener, such as welding, for example and without limitation.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A tight-seal piping assembly comprising:
a connecting piping component defining a component axis and comprising:
an outer piping surface;
an inner piping surface opposite the outer piping surface;
exterior threading defined in the outer piping surface; and
a piping end comprising:
a portion of the outer piping surface oriented substantially parallel to the component axis of the connecting piping component and extending from the piping end to the exterior threading on the connecting piping component; and
a pipe engagement surface extending at an acute angle to the component axis from the inner piping surface to the outer piping surface; and
a tight-seal piping component comprising:
a fitting body defining a fitting inner surface, a fitting outer surface opposite the fitting inner surface, a first fitting end, and a second fitting end opposite the first fitting end, the fitting inner surface defining:
an interior channel defining a fitting axis and an inner diameter;
a groove defining an outer diameter;
a seal stop surface abutting the groove within the interior channel; and
internal threading spaced axially inward from the first fitting end and disposed between the first fitting end and the groove, the internal threading defining the inner diameter defined by straight threading extending in a direction about perpendicular to the fitting axis; and
a seal received within the outer diameter of the groove in the interior channel and abutting the seal stop surface, wherein:
the outer diameter of the groove is greater than the inner diameter of the internal threading; and
in an engaged position defined by the connecting piping component and the tight-seal piping component, the seal is compressed in the groove between the outer diameter of the groove and the portion of the outer piping surface of the piping end.

2. The tight-seal piping assembly of claim 1, wherein the fitting body defines an inner flange extending radially inward from the fitting inner surface, the inner flange defining the seal stop surface, the seal stop surface facing the first fitting end, the seal stop surface oriented about perpendicular to the fitting axis.

3. The tight-seal piping assembly of claim 1, wherein:
the seal defines a seal outer surface, a seal inner surface opposite the seal outer surface, a planar first seal wall extending between the seal outer surface and the seal inner surface, and a planar second seal wall opposite the planar first seal wall and extending between the seal outer surface and the seal inner surface; and
the planar first seal wall confronts the seal stop surface and the planar second seal wall faces the first fitting end.

4. The tight-seal piping assembly of claim 1, wherein:
the seal stop surface is a first seal stop surface, the internal threading is first internal threading, and the seal is a first seal;
the fitting inner surface further defines a second seal stop surface within the interior channel and a second internal threading between the second fitting end and the second seal stop surface;
the second internal threading defines straight threading extending in a direction about perpendicular to the fitting axis; and the tight-seal piping component further comprises a second seal received within the interior channel and abutting the second seal stop surface.

5. The tight-seal piping assembly of claim 4, wherein the fitting body defines an inner flange extending radially inward from the fitting inner surface, the inner flange defines the first seal stop surface and the second seal stop surface opposite the first seal stop surface.

6. The tight-seal piping assembly of claim 1, wherein the fitting outer surface defines external threading proximate to the second fitting end.

7. The tight-seal piping assembly of claim 6, wherein the external threading of the fitting outer surface defines straight threading extending in a direction about perpendicular to the fitting axis.

8. The tight-seal piping assembly of claim 6, further comprising a compression nut assembly disposed at the second fitting end, the compression nut assembly comprising a compression nut defining a nut channel and a gasket oriented within the nut channel, the second fitting end extending into the nut channel and contacting the gasket.

9. The tight-seal piping assembly of claim 1, further comprising a saddle portion coupled to the fitting body at the second fitting end, the saddle portion defining an arcuate body, the arcuate body defining a first lateral side and a second lateral side, a lug extending from each of the first lateral side and the second lateral side.

10. The tight-seal piping assembly of claim 1, wherein the outer piping surface of the connecting piping component extends into the groove.

11. The tight-seal piping assembly of claim 1, wherein the fitting body comprises a material selected from the group consisting of brass, steel, plastic, and a composite material.

12. The tight-seal piping assembly of claim 1, wherein the fitting body comprises a metal material selected from the group consisting of brass, steel, and stainless steel.

13. The tight-seal piping assembly of claim 1, wherein the seal comprises a material selected from the group consisting of rubber, silicone, and neoprene.

14. A tight-seal piping assembly comprising:
a fitting body defining a fitting inner surface, the fitting inner surface defining an interior channel with an inner diameter and a groove comprising an outer diameter that is greater than the inner diameter, a seal stop surface within the interior channel, and straight threading spaced axially from a first fitting end of the fitting body within the interior channel and oriented between the seal stop surface and the first fitting end of the fitting body;
a connecting piping component comprising an outer piping surface defining mating straight threading proximate to a first piping end of the connecting piping component, and a pipe engagement surface oriented at an angle to the outer piping surface, wherein the fitting body and the connecting piping component define an engaged position in which the first piping end of the connecting piping component is received within the interior channel and the straight threading is rotationally engaged with the mating straight threading; and
a seal defining an outer seal surface received within the outer diameter of the groove in the interior channel and wherein, in the engaged position:
the outer piping surface of the connecting piping component extends into the groove;
the seal is compressed in the groove between the seal stop surface and the first piping end of the connecting piping component; and the seal expands into the groove between the outer diameter of the groove and the outer piping surface of the connecting piping component.

15. The tight-seal piping assembly of claim 14, wherein a fitting axis is defined through a center of the interior channel, the fitting body defines an inner flange extending radially inward from the fitting inner surface, the inner flange defines the seal stop surface, the seal stop surface oriented about perpendicular to the fitting axis.

16. The tight-seal piping assembly of claim 14, wherein;
the seal defines a planar first seal wall and a planar second seal wall opposite the planar first seal wall;
the planar first seal wall abuts the seal stop surface; and
the first piping end of the connecting piping component engages the planar second seal wall.

17. The tight-seal piping assembly of claim 14, wherein:
the fitting body further defines second straight threading proximate to a second fitting end of the fitting body, the second fitting end opposite the first fitting end; and
the tight-seal piping assembly further comprises a second connecting piping component defining mating straight threading proximate to the first piping end of the second connecting piping component, wherein the second straight threading of the fitting body is rotationally engaged with the mating straight threading of the second connecting piping component.

18. The tight-seal piping assembly of claim 17, wherein:
the second straight threading of the fitting body is defined on a fitting outer surface of the fitting body, the fitting outer surface opposite the fitting inner surface; and
the mating straight threading of the second connecting piping component is defined on an inner piping surface of the second connecting piping component.

19. The tight-seal piping assembly of claim 17, wherein:
the fitting body further defines a second seal stop surface;
the second straight threading of the fitting body is defined on the fitting inner surface between the second seal stop surface and the second fitting end;
the mating straight threading of the second connecting piping component is defined on an outer piping surface of the second connecting piping component; and
a second seal is compressed between the second seal stop surface and the first piping end of the second connecting piping component.

20. The tight-seal piping assembly of claim 19, wherein the fitting body defines an inner flange extending radially inward from the fitting inner surface, the inner flange defines the seal stop surface and the second seal stop surface opposite the seal stop surface.

21. The tight-seal piping assembly of claim 14, further comprising a compression nut assembly disposed at a second fitting end, the compression nut assembly comprising a compression nut and a gasket, the second fitting end extending into a nut channel of the compression nut, the gasket disposed between the compression nut and the second fitting end.

22. The tight-seal piping assembly of claim 14, wherein:
the connecting piping component further defines an inner piping surface;
the first piping end defines the pipe engagement surface tapering from the outer piping surface to the inner piping surface; and
the pipe engagement surface engages the seal.

23. The tight-seal piping assembly of claim 14, wherein the pipe engagement surface comprises an obtuse surface configured to press the seal towards the seal stop surface of the tight-seal piping component in the engaged position.

24. The tight-seal piping assembly of claim 14, wherein the pipe engagement surface comprises a substantially perpendicular surface such that the seal is formed between the substantially perpendicular surface of the pipe engagement surface and the seal stop surface of the fitting body as well as the outer diameter of the groove.

25. The tight-seal piping assembly of claim 14, wherein the pipe engagement surface defines an acute angle configured to press the seal towards the outer diameter of the groove in the engaged position and in a disengaged position, the seal is spaced from the outer diameter of the groove.

26. The tight-seal piping assembly of claim 25, wherein compressing the outer seal surface of the seal further comprises advancing the pipe engagement surface to prevent the seal from advancing through the interior channel toward the inner diameter of the fitting body.

\* \* \* \* \*